United States Patent [19]

Bronfin et al.

[11] Patent Number: 5,200,822

[45] Date of Patent: Apr. 6, 1993

[54] ARRANGEMENT FOR AND METHOD OF PROCESSING DATA, ESPECIALLY FOR IDENTIFYING AND VERIFYING AIRING OF TELEVISION BROADCAST PROGRAMS

[75] Inventors: Kenneth A. Bronfin, New York, N.Y.; Stephen M. Mahrer, Mt. Holly, N.J.; W. Robin Wilson, New York, N.Y.; Francis A. Davenport, Haddonfield, N.J.

[73] Assignee: National Broadcasting Company, Inc., New York, N.Y.

[21] Appl. No.: 690,111

[22] Filed: Apr. 23, 1991

[51] Int. Cl.[5] .............................................. H04N 7/08
[52] U.S. Cl. .................................................... 358/142
[58] Field of Search .................. 358/84, 142, 146, 147

[56] References Cited

U.S. PATENT DOCUMENTS

| | | | |
|---|---|---|---|
| 4,051,532 | 9/1977 | Hilbert et al. | 358/142 |
| 4,230,990 | 10/1980 | Lert, Jr. et al. | 358/142 |
| 4,237,484 | 12/1980 | Brown et al. | 358/142 |
| 4,450,531 | 5/1984 | Kenyon et al. | 364/604 |
| 4,547,804 | 10/1985 | Greenberg | 358/142 |
| 4,639,779 | 1/1987 | Greenberg | 358/142 |
| 4,647,974 | 3/1987 | Butler et al. | 358/185 |
| 4,739,398 | 4/1988 | Thomas et al. | 358/84 |
| 4,783,699 | 11/1988 | DePaul | 358/142 |
| 4,805,020 | 2/1989 | Greenberg | 358/147 |
| 4,807,031 | 2/1989 | Broughton et al. | 358/142 |
| 4,843,562 | 6/1989 | Kenyon et al. | 364/487 |
| 4,849,817 | 7/1989 | Short | 358/142 |
| 4,855,827 | 8/1989 | Best | 358/142 X |
| 4,931,871 | 6/1990 | Kramer | 358/142 |
| 4,945,412 | 7/1990 | Kramer | 358/142 |
| 4,959,717 | 9/1990 | Faroudja | 358/141 X |
| 4,969,041 | 11/1990 | O'Grady et al. | 358/142 |
| 5,055,924 | 10/1991 | Skutta | 358/142 X |
| 5,068,728 | 11/1991 | Macovski | 358/142 X |
| 5,075,773 | 12/1991 | Pullen et al. | 358/142 X |

*Primary Examiner*—Victor R. Kostak
*Attorney, Agent, or Firm*—Rosenman & Colin

[57] ABSTRACT

Data are added invisibly to the active video component of a television signal by a modulated carrier. The data, upon recovery, may be used for numerous purposes, including network signaling, data transmission, program identification, remote machine control, broadcast verification, and signal quality detection and measurement.

35 Claims, 3 Drawing Sheets

ARRANGEMENT FOR AND METHOD OF PROCESSING DATA, ESPECIALLY FOR IDENTIFYING AND VERIFYING AIRING OF TELEVISION BROADCAST PROGRAMS

BACKGROUND OF THE INVENTION

1. Field of the Invention

This invention generally relates to an arrangement for, and a method of, processing proprietary data on the active video component of a television signal, and on a plurality of lines of a picture to be displayed on a viewing screen of a television receiver, in a manner substantially invisible to a viewer, and, more particularly, to an arrangement for, and a method of, automatically identifying and verifying the airing of television broadcast programs, especially commercials.

2. Description of Related Art

It is known to automatically identify and verify the broadcast of television programs, such as first-run or syndicated feature programs and commercials, by replacing the active video component of a preselected scan line of a picture with a digital code which uniquely identifies the program. U.S. Pat. Nos. 4,547,804 and 4,639,779 teach that the identifying code is inserted on scan line 20 of a television picture. U.S. Pat. No. 4,805,020 teaches that the identifying code is inserted on scan line 22 of the television picture. Since all television receivers over-scan the screen, the first line of video information that is actually visible to a viewer is about scan line 30. Hence, the use of line 20 in the over-scan region of the television signal does not degrade the picture actually seen by the viewer, and the use of line 22 may degrade the picture on future receivers.

Although the known program verification systems are generally satisfactory for their intended purpose, the use of a single predetermined scan line to contain the identification code has not proven to be altogether satisfactory or practical. It is possible to use line 20 or 22 for other purposes, thereby limiting the available room to insert the identification code, as well as other program-related encoded information. Also, the identifying code is easily strippable, whether intentional or not, from a predetermined scan line, e.g. by a local affiliate station, thereby compromising the ability of a network broadcast station to reliably audit an affiliate's broadcast of particular programs, especially commercials.

Other known broadcast verification systems involve the use of sub-audible codes in the audio signal, for example, see U.S. Pat. Nos. 4,931,871 and 4,945,412, as well as the use of pattern recognition techniques; for example, see U.S. Pat. Nos. 4,230,990; 4,450,531; 4,739,398 and 4,843,562.

Aside from broadcast verification systems, it is known to combine other signals with television signals. For example, U.S. Pat. No. 4,647,974 encodes a trigger signal in the active video portion of a television signal in order to automatically insert local station information, such as call letters or a logo, into network supplied material, such as promotional announcements. U.S. Pat. No. 4,783,699 encodes textual information into the horizontal synchronizing pulse of a television signal. U.S. Pat. No. 4,051,532 encodes auxiliary signals, e.g., subtitles for the hearing impaired, special notices, etc. onto the television signal. U.S. Pat. No. 4,807,031 encodes control data onto the television signal for remotely controlling interactive devices, e.g., educational aids or action toys, located in viewers' homes or schools.

SUMMARY OF THE INVENTION

Objects of the Invention

It is an object of this invention to advance the state of the art of identifying an d verifying television broadcast program airings, especially commercials.

It is another object of this invention to reliably process proprietary data, especially television program identification and verification data, with a television signal without degrading picture quality.

Another object of this invention is to reliable verify the airing of commercials by affiliate stations.

A further object of this invention is to prevent intentional or unintentional stripping o a program identification code form the television signal.

Yet another object of this invention is to remotely control equipment at local affiliate stations. reliably transmit and receive data of any king, preferably at a slow rate, e.g. less than 960 baud.

Another object of this invention is to reliably detect the quality of the video signals transmitted received together with a carrier of the signals.

Features of the Invention

In keeping with these objects, and others which will become apparent hereinafter, one feature of this invention resides, briefly stated, in a method of, and an arrangement for, processing proprietary data, especially program identification and verification data, with a television signal which conventionally has an active video component and a timing component for each line of a picture to be displayed on a viewing area of a television receiver.

A carrier signal is generated in timed relation to the timing component of the television signal. A data signal indicative of the data to be processed is also generated. The carrier signal and the data signal are modulated together in timed relation to the timing component of the television signal to form a data-modulated signal having a low amplitude in a range from 0.1 to 2.5 IRE. The low amplitude may be a fixed value, or a variable value that changes in said range.

The data-modulated signal is then added to the active video component of the television signal to form an encoded composite signal on a plurality of lines of the picture. The encoded composite signal is subsequently transmitted to the receiver for displaying the picture on the viewing area.

Hence, rather than inserting a program identification code in a preselected single scan line in an over-scan region of the receiver, as taught by the prior art, this invention proposes that the identification code (the data) be spread over a plurality of the lines of the picture in the line of sight of the viewer. However, the viewer cannot see the data-modulated signal superimposed on the plurality of lines of the picture due to the low amplitude of the data-modulated signal, as well as its timed relation to the timing component of the television signal, together with the inherent integration and resolution characteristics of the human eye. Preferably, the low amplitude of the data-modulated signal is adjusted to a fixed or variable magnitude within the aforementioned range.

The data itself is composed of alphabetic and/or numerical characters. Each character preferably is encoded as 6 bits. Each field of the picture is subdivided into multiple data cells, each preferably comprising about 60 lines. Each data cell is used to generate one bit of the data. In the preferred embodiment, the data rate is 240 baud, and about 30 characters per second are transmitted. Other data rates are, of course, also within the spirit of this invention. The number of lines over which the data is spread is more than two lines, may constitute one or more data cells, or may constitute all the lines of the picture.

It will be appreciated that the use of multiple lines to transmit a single bit of information inherently provides for more system reliability and more immunity to decoding errors. The identification code is thus spread over many lines and over many fields, and is much harder to be stripped to compromise overall system security. Sufficient room exists for other information to be transmitted, such information including the time and date of the program transmission, network and local affiliate identification information, as well as control signals to control equipment at a local affiliate station, or peripheral accessories located adjacent television receivers in viewers' homes, schools, or the like.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
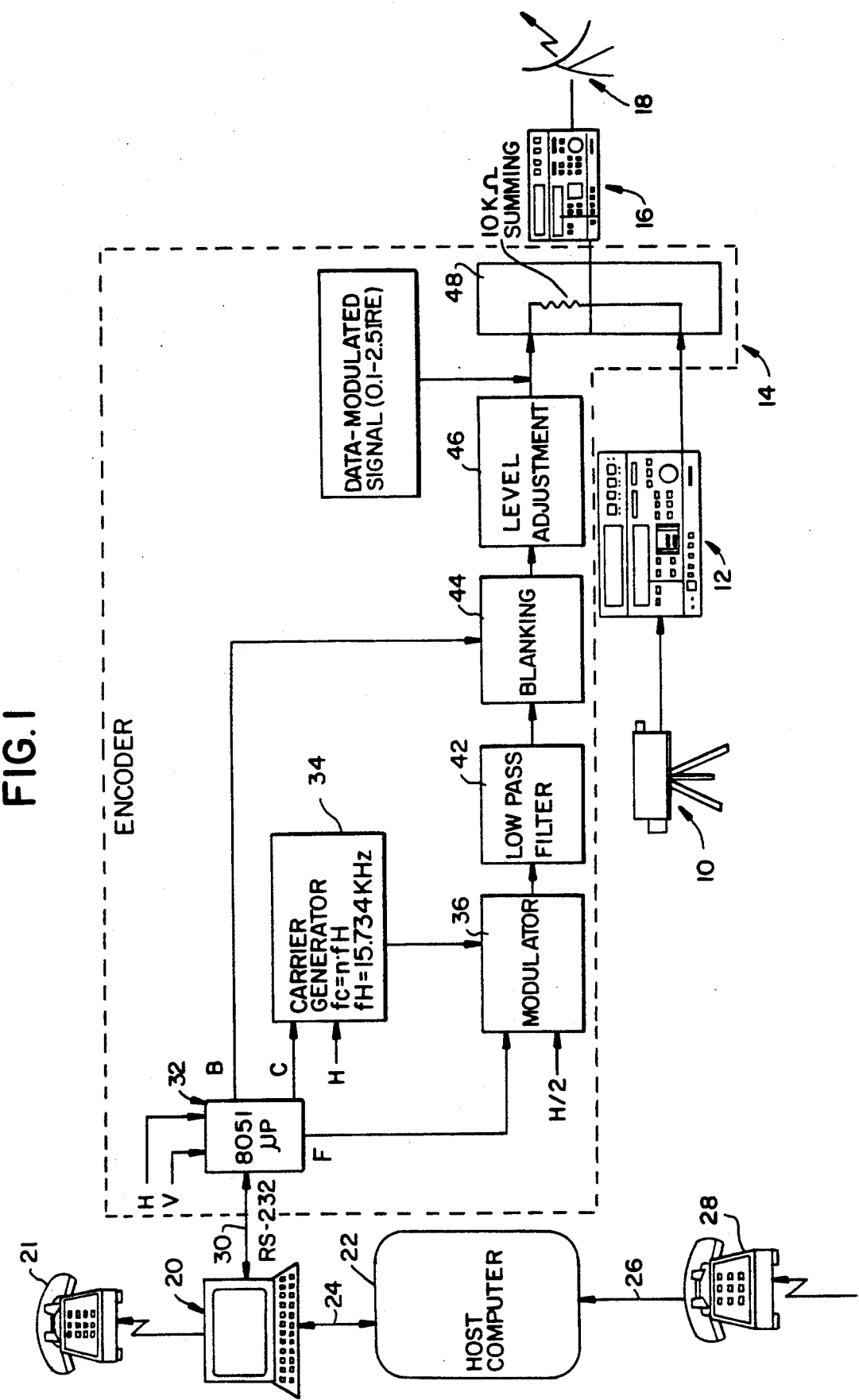
FIG. 1 is a partly diagrammatic view of an arrangement at the transmitting end of the overall system in accordance with this invention.

Referring now to the drawings, reference numeral 10 generally identifies a conventional television camera for generating a television signal having video, audio and timing components. The video component comprises video material, such as a program, a commercial, or other form of video information, for transmission by a television network to a plurality of local stations and, in turn, to a multitude of television receivers.

The video component forms a picture composed of multiple lines on a viewing screen at each receiving station. The timing component includes horizontal H and vertical V synchronizing signal components, as well as horizontal and vertical beam blanking B components. As is well known, the vertical beam blanking components blank a scanning electron beam of a cathode ray tube at each receiver during the re-trace or vertical blanking interval of the beam. The television signal is transmitted at a field rate whose frequency of transmission is specified by governmental authorities. At the completion of each field, a vertical blanking signal blanks the scanning beam, and the scanning beam then re-traces to start the subsequent field. Two such fields constitute a frame of the picture on the screen.

The video program may be transmitted live or, as is more often the case, is recorded on magnetic tape by a recorder either on-board the camera or remotely therefrom, by a video recorder/player 12. In accordance with this invention, the video program is encoded with proprietary data by an encoder 14. The encoded program is then copied at a dubbing studio by a video recorder/player 16. The number of copies made of the program depends on distribution requirements. These copies may be sent to local affiliate stations of the network. Alternatively, the program can be broadcast at a designated time to all local stations by a satellite dish 18 or by an analogous transmitting device. Thereupon, the local stations re-transmit the program by terrestrial transmitter to a multitude of television receivers, typically located in the homes of individuals.

The proprietary data may take many forms. For example, in the case where it is desired to electronically verify that a network commercial has been aired by local affiliates, the data comprises the name or signature code of the commercial, the type of commercial, the advertiser's name, the time/date of transmission of the commercial by the network and/or affiliate, the name of the network and/or the affiliate, etc. Other program data might include control signals to control affiliate station equipment, e.g. local graphics devices, tape machines, program routers, or home viewer peripheral equipment, e.g., interactive games, printers, computers, etc.

The data is composed of alphabetic and/or numerical characters, preferably an 8-character alpha-numeric ISCI code. Each character is preferably encoded as 6 bits. As explained in greater detail below, the picture field is composed of multiple lines, e.g., about 240 lines, in the main body of the picture which lies within the direct line of sight of a viewer. The field is subdivided into multiple data cells. For example, if each data cell comprises about 60 lines, then each field is divided into four data cells. Each data cell is used to generate one bit of data. In the preferred embodiment, the data rate is 240 baud, and 30 characters per second are transmitted.

The data may be loaded into the encoder 14 in digital form by keyboard entry at a computer terminal 20. The terminal 20 can be a stand-alone data which communicates with the telephone modem 21, or may be connected to a host computer 22 to which other computer terminals 20 for other encoders are connected. The host computer 22 essentially serves as a large data base to and from which data from the terminal 20 is transmitted and received over data bus 24. The host computer 22 is connected by a telephone and modem link 26 to a telephone 28 whose operation is described in further detail below.

A digital signal representative of the entered data is conducted along an RS-232 data bus 30 to a control microprocessor 32, preferably an Intel Model No. 8051 which provides all necessary control C, blanking B and formatted data F signals. The microprocessor 32 is fed with horizontal H and vertical V synchronizing signals derived from the television signal. The synchronizing signals are used to synchronize the data signal for insertion into the television signal. The formatted data signal is preferably outputted at a data rate of 240 baud.

A carrier signal generator 34 includes a low phase noise programmable frequency synthesizer. The frequency of the carrier signal is preferably an integer multiple of the horizontal synchronizing signal H. The multiplication factor is determined by a constant stored in the microprocessor and retrieved from the control signal C. The horizontal synchronizing signal frequency is set at an NTSC (System M) standard of 15,734.263 Hz. In the preferred embodiment, the constant is a number in a range from 109 to 117. Hence, the carrier signal frequency is in the range from 1.7 to 1.9 MHz. As described below in the so-called "frequency-agile" embodiment of FIG. 5, frequencies outside of said range are also possible.

Figure 4:
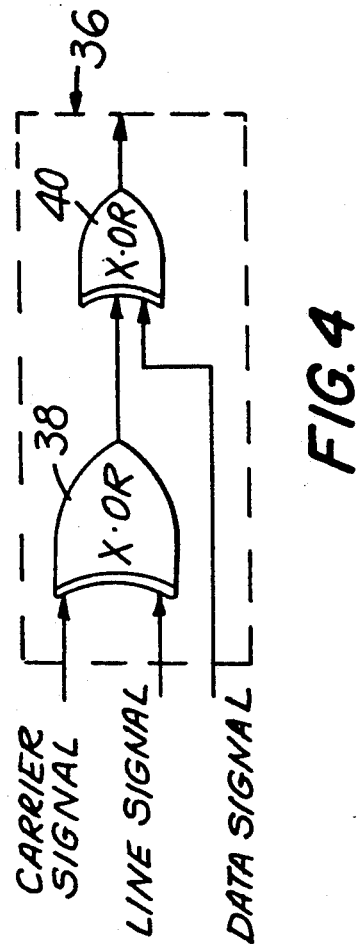
FIG. 4 is an electrical schematic of the modulator of FIG. 1.

The carrier signal from the generator 34 and the formatted data signal from the microprocessor 32 are fed to a modulator 36. A line pair signal H/2, whose frequency is half the frequency of the horizontal synchronizing signal, is also fed to the modulator 36. The modulator is preferably a phase shift keying (PSK) modulator composed of two programmable inverters, for example, exclusive-OR gates. As shown in FIG. 4, a first gate 38 is fed with the line pair signal and the carrier signal, thereby producing a phase-switched output signal whose phase is inverted by 180° at an H/2 rate, i.e., every two lines. This output signal is fed together with the formatted data signal to a second gate 40 where the data-modulated output signal has a phase that is inverted by 180° on a line-by-line basis.

The data-modulated output signal is fed to a low pass filter 42. Preferably, the filter is an elliptic (Cauer) filter having a 2.2 MHz passband and a filter "zero" at 3.58 MHz to eliminate contamination of the video signal's color sub-carrier by second harmonic products of the data-modulated signal.

The filtered signal is next fed to a blanking circuit 44 wherein the blanking signal B from the microprocessor 32 blanks the data-modulated signal. This blanking is timed to be about 2µs inside of the active video portion of the television signal to resist any contamination with the synchronizing signals.

Thereupon, the signal is fed to a level adjustment circuit 46, preferably a potentiometer which is manually adjustable to set the amplitude of the data-modulated signal to be at a selected fixed value in a range from 0.1–2.5 IRE. The nominal amplitude level is set for 0.5 IRE (3.57 mV peak-to-peak).

Figure 5:
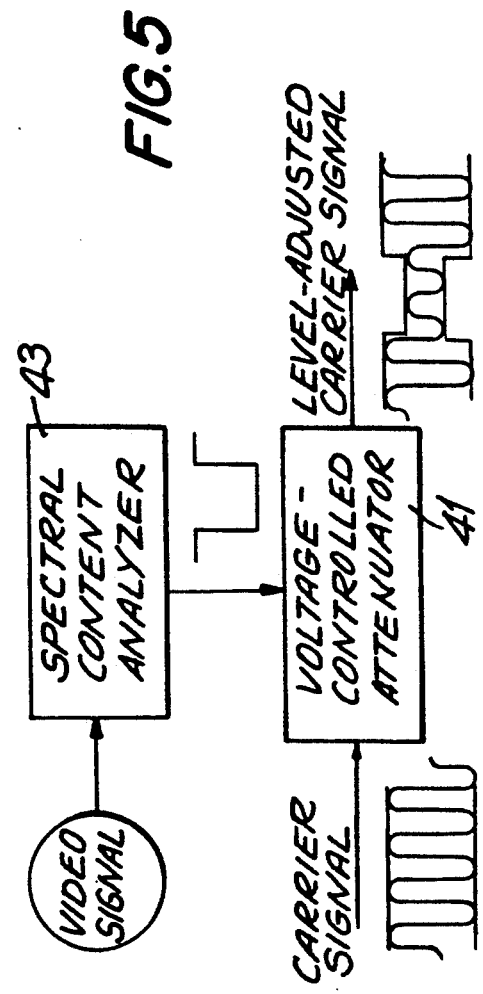
FIG. 5 is a block diagram of a variation of the level adjustment of FIG. 1.

Rather than manually adjusting a fixed value, this invention also proposes, as shown in FIG. 5, automatically adjusting a variable amplitude data-modulated signal. This variable amplitude signal is generated by, for example, a voltage-controlled attenuator 41 whose input is controlled by an analyzer 43 that analyzes the spectral content of the video component of the television signal. The spectral content can be analyzed in conventional manner by selective filtering of the television signal. The adjustment of the variable signal may, in certain applications, be preferred over the adjustment of a fixed signal, particularly when it is desired to minimize the visibility of the data-modulated signal, and also maximizing the reliability of data transmission and reception.

Next, the low amplitude data-modulated signal and the television signal are added together to form a composite signal in a summing circuit 48 which is advantageously embodied as a high-homage resistor, e.g., 10KΩ. This large value resistor provides isolation and attenuation which is particularly useful in the event that a large unwanted signal suddenly appears on the data input line due to system failure. The resistor will attenuate the large unwanted signal to a smaller, safer value to protect the system.

The low amplitude data-modulated signal is added to the active video component of the television signal. After transmission of the composite signal, the data-modulated signal is present on a plurality of lines of the picture displayed at a viewing screen of each receiver within the direct line of sight of a viewer. The data-modulated signal which is spread over the plurality of lines in the main body of the picture is substantially invisible to the viewer due to its low amplitude, its timed relation to the horizontal synchronizing signal rate, and the inherent integration and resolution characteristics of the human eye. Of course, the data-modulated signal could be spread over any predetermined number of lines, or over each and every line, of the picture.

Figure 2:
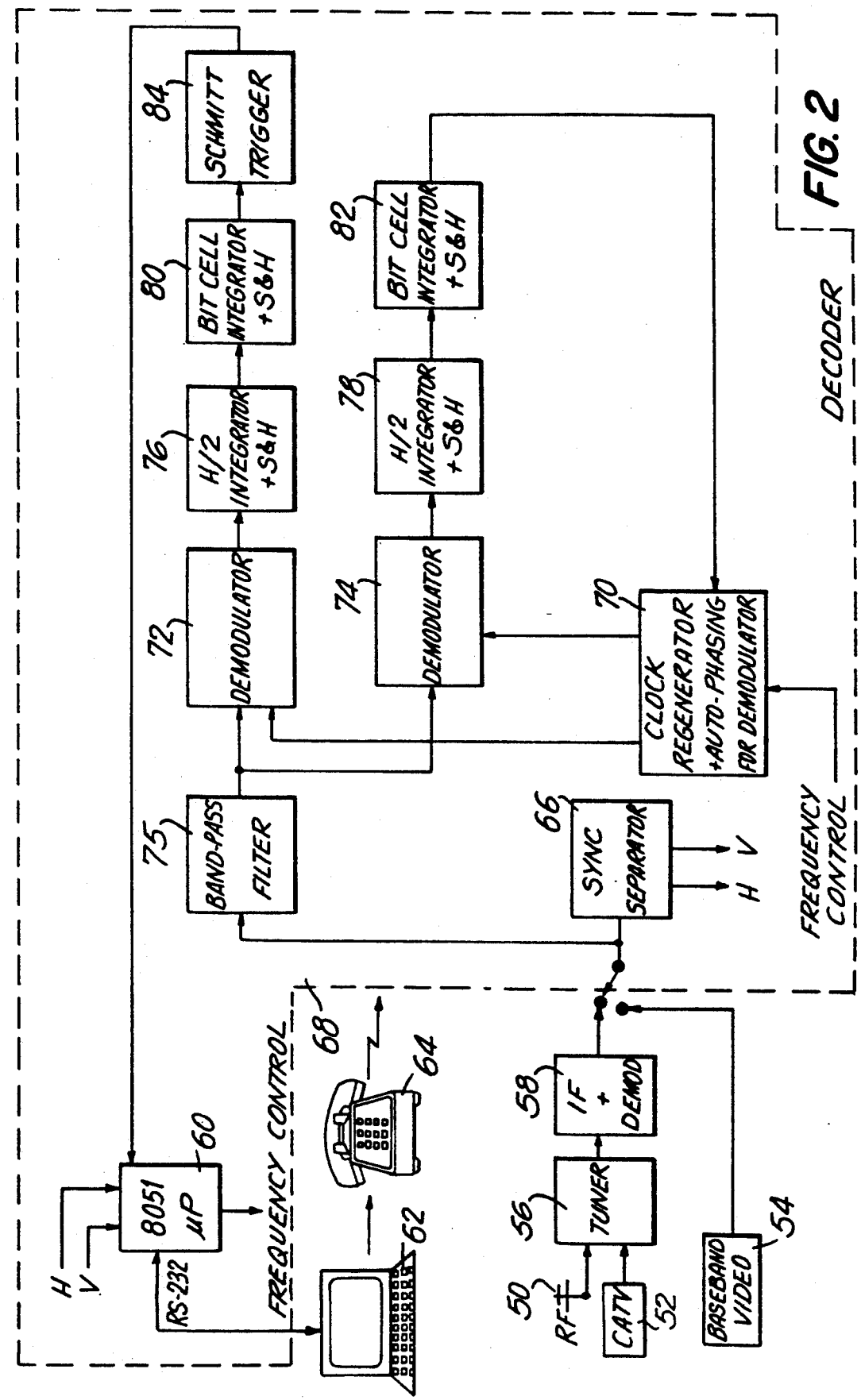
FIG. 2 is a partly diagrammatic view of an arrangement at the receiving end of the overall system in accordance with this invention.

Turning now to FIG. 2, the transmitted composite signal is received by a receiver such as radio frequency antenna 50, or cable decoder box 52, or received in baseband (unmodulated) video 54, etc. A microprocessor 60 similar to microprocessor 32 receives the horizontal and vertical synchronizing signals and outputs a frequency control signal, as well as data extracted from the composite signal to a computer terminal 62. The terminal 62 is, in turn, connected via a telephone link and modem to a telephone 64 which, in turn, is connected to host computer 22 through the telephone link 28. The frequency control signal is fed to a multiband television tuner 56 to select a desired channel on either a direct broadcast or a CATV band. Conventional intermediate frequency and demodulating circuit 58 provides necessary demodulation and control over the video signal and radio frequency level of the television signal. The baseband video signal 54, preferably obtained from a video tape recorder, bypasses the tuner 56 and intermediate frequency-demodulating circuit 58.

A synchronization separator 66 in a decoder arrangement 68 generates horizontal and vertical synchronizing signals H, V from the received composite television signal. These synchronizing signals are used to synchronize the microprocessor 60 and the decoder arrangement 68.

A clock regenerator and auto-phasing circuit 70 is analogous to the carrier generator 34 of FIG. 1. The frequency control signal of the microprocessor 60 is fed to the circuit 70. A programmable low noise frequency synthesizer is used to provide a stable clock signal that is timed in relation to the horizontal synchronizing signal. This clock signal is used for synchronous demodulation of the data-modulated signal and is fed to a pair of demodulators 72, 74.

A bandpass transversal filter 75 is used to eliminate problems of non-linear phase or group delay response. In the preferred embodiment, the filter 75 has a 1.79 MHz passband and a filter "zero" at 3.58 MHz to reduce chrominance-to-data crosstalk with a color sub-carrier of the television signal.

The demodulators 72, 74 are identical in function and are each connected to the output of the filter 75. Both are synchronous demodulators constructed around double-balanced modulators. The outputs of the demodulators 72, 74 are fed respectively to H/2 integrator subcircuits and sample-and-hold subcircuits 76, 78 which are identical in function. Each integrator is an operational amplifier which is re-set every two lines at an H/2 rate (7.8 kHz). At the end of this two-line integration period, each sample-and-hold subcircuit is activated to sample the peak signal achieved by its respective integrator.

The use of an H/2 integrator tends to cancel out any video-related signals demodulated in circuits 72, 74. The phase of the data-modulated signal is reversed by 180° on adjacent lines. The data-modulated signal and the clock signal always have the same phase relationship in any line pair. This results in a net charge to the integrator. The unwanted video content of the demodulated signal will tend to cancel across each two-line integration period due to the fact that it does not follow the phase reversal. Each two-line integrator provides correlation over some 185 cycles of the demodulated signal.

The outputs of the subcircuits 76, 78 are respectively fed to bit cell integrator subcircuits and sample-and-hold subcircuits 80, 82, which again are identical in function. Each subcircuit 80, 82 adds extra correlation over a data cell which, as previously noted, is approximately 60 television lines at 240 baud. This results in a reduction in the video interference with the low level data-modulated carrier. Each sample-and-hold subcircuit 80, 82 samples the peak signal achieved at the end of each data cell, that is, after every 60 lines.

The subcircuit 80 is connected to a Schmitt trigger circuit 84 which is essentially an analog-to-digital converter. The circuit 84 converts the bi-polar analog signal present at the output of circuit 80 to a digital signal for conveyance to the microprocessor 60 which is then operative to interpret the digital signal as data, i.e., the data that was originally entered at computer terminal 20.

The circuits 70, 74, 78, 82 are operative for providing quadrature demodulation of a suppressed carrier. An error signal derived from circuits 74, 78, 82 is fed along a feedback loop and is used as an auto-phasing signal to correct the phase of the local oscillators used in the synchronous demodulators 72, 74.

Figure 3:
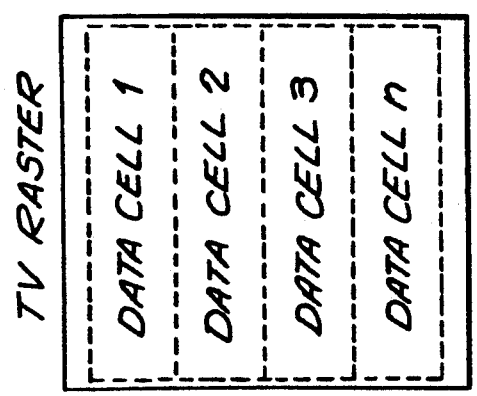
FIG. 3 is a schematic view of a television receiver screen subdivided into data cells.

The data signal transmission rate is determined by the number of data cells per television field. The initial implementation of this invention is configured for four data cells per field (see FIG. 3). Each data cell is comprised of an integer number of television lines, and the duration of each datacell is derived by simply dividing the number of active television lines by the number of data cells per field (where two fields = one frame). The active video portion of a standard televison signal comprises about 240 lines. Thus, four cells per field will result in 60 lines per data cell. System testing has shown that a system can be operable beyond 960 baud.

When the present invention is used as a broadcast verification system to verify the airing of programs, commercials and promotional materials, reporting can be performed on a weekly, daily or even a "real-time" basis. To that end, host computer 22 can call up the data stored in terminal 62 via the modems 28,64 to retrieve the stored data as often as desired. Any authorized terminal can now access the data stored in the host computer 22 as often as-desired. Information can be provided not only on the time and date that a particular broadcast was aired, but can also describe if a broadcast ran in its entirety, or if any significant technical problem, e.g., audio or video signal breakup, occurred during the broadcast.

Immediate feedback of all station clearances of network programming could also be obtained and would be useful in determining station compensation and resolving program clearance issues.

In addition to encoding identification data on all broadcasts, a network identification signal and the time and date of each broadcast may be encoded on all material transmitted across a network, thereby providing the network with the ability to positively identify video material that has been reproduced, rebroadcast or sold without approval. Encoding could be implemented on inter-company feeds, or between news bureaus and headquarters.

In another implementation, special remote control signals can be encoded on the television signal to all network affiliate stations for the control of station equipment, e.g., graphics devices, routers, or tape machines. In addition, commercial applications existing today that utilize television's vertical blanking interval to transmit data to external devices can be implemented with the present invention. Such examples include interactive games, and credit card verification.

As previously mentioned, the carrier signal frequency $f_C$ is an integer multiple of the horizontal scan line frequency $f_H$, the relationship (n) being controlled by the microprocessor 32. However, rather than storing a fixed value of n, as previously described, this invention proposes that the value of n be varied in order to secure the data to be processed and to prevent outside parties from jamming the carrier signal frequency.

For example, the microprocessor 32 can be programmed to generate a series of different values of n, or a series of addresses which refer to a look-up table that stores different values of n. Alternatively, the data signal could include a so-called "key" for tuning the generator 34 to various frequencies. The key could be transmitted as often as necessary to ensure security.

It will be understood that each of the elements described above, or two or more together, also may find a useful application in other types of constructions differing from the types described above.

While the invention has been illustrated and described as embodied in an arrangement for and method of processing data, especially for identifying and verifying airing of television broadcast programs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of processing data with a television signal having an active video component and a timing component for lines of a picture to be displayed on a viewing area of a television receiver, comprising the steps of:

(a) generating a carrier signal in timed relation to the timing component of the television signal;

(b) generating a data signal indicative of the data to be processed;

(c) modulating the carrier signal and the data signal in timed relation to the timing component of the television signal to form a data-modulated signal having a low amplitude in a range from 0.1 to 2.5 IRE;

(d) adding the data-modulated signal to the active video component of the television signal to form an encoded composite signal on a plurality of lines of the picture; and (e) transmitting the encoded composite signal to the receiver for displaying the picture on the viewing area, said data-modulated signal on said plurality of lines of the picture being substantially invisible to a viewer of the picture due to said low amplitude.

2. The method according to claim 1, wherein the timing component includes a horizontal scan line frequency, and wherein the step of generating the carrier signal includes generating the carrier signal with a frequency that is an integer multiple of the horizontal scan line frequency.

3. The method according to claim 1, wherein the step of generating a data signal includes coding the data signal with identifying data related to transmission of the television signal.

4. The method according to claim 3, wherein the identifying data include a program identifying signature and time-and-date broadcast information.

5. The method according to claim 1, and further comprising the step of adjusting the low amplitude of the data-modulated signal to a fixed magnitude within said range.

6. The method according to claim 1, and further comprising the step of adjusting the low amplitude of the data-modulated signal to a variable magnitude within said range.

7. The method according to claim 1, and further comprising the steps of receiving the transmitted composite signal, demodulating the received composite signal in timed relation to the modulating step to extract the data signal from the demodulated composite signal, and processing the data signal to form the data.

8. The method according to claim 7, and further comprising digitally formatting the data by combining multiple lines of a field of the picture to constitute a single bit of information, by combining multiple bits to constitute a single character, and by combining multiple characters to constitute the data.

9. The method according to claim 8, wherein the field includes multiple data cells, each composed of said multiple lines, each data cell containing different information.

10. The method according to claim 7, wherein the processing step includes storing the data signal for subsequent reference.

11. The method according to claim 1, wherein the adding step is performed for each line of the picture.

12. An arrangement for processing data with a television signal having an active video component and a timing component for lines of a picture to be displayed on a viewing area of a television receiver, comprising:

(a) means for generating a carrier signal in timed relation to the timing component of the television signal;

(b) means for generating a data signal indicative of the data to be processed;

(c) means for modulating the carrier signal and the data signal in timed relation to the timing component of the television signal to form a data-modulating signal having a low amplitude in a range from 0.1 to 2.5 IRE;

(d) means for adding the data-modulated signal to the active video component of the television signal to form an encoded composite signal on a plurality of lines of the picture; and (e) means for transmitting the encoded composite signal to the receiver for displaying the picture on the viewing area, said data-modulated signal on said plurality of. lines of the picture being substantially invisible to a viewer of the picture due to said low amplitude.

13. The arrangement according to claim 12, wherein the timing component includes a horizontal scan line frequency, and wherein the means for generating the carrier signal is operative for generating the carrier signal with a frequency that is an integer multiple of the horizontal scan line frequency.

14. The arrangement according to claim 12, wherein the means for generating a data signal is operative for coding the data signal with identifying data related to transmission of the television signal.

15. The arrangement according to claim 14, wherein the identifying data include a program identifying signature and time-and-date broadcast information.

16. The arrangement according to claim 12, and further comprising means for adjusting the low amplitude of the data-modulated signal to a fixed magnitude within said range.

17. The arrangement according to claim 12, further comprising means for adjusting the low amplitude of the data-modulated signal to a variable magnitude within said range.

18. The arrangement according to claim 12, wherein the adding means forms the composite signal on each line of the picture.

19. The arrangement according to claim 12, and further comprising means for receiving the transmitted composite signal, means for demodulating the received composite signal in timed relation to the modulating means to extract the data signal from the demodulated composite signal, and means for processing the data signal to form the data.

20. The arrangement according to claim 19, and further comprising means for digitally formatting the data by combining multiple lines of a field of the picture to constitute a single bit of information, by combining multiple bits to constitute a single character, and by combining multiple characters to constitute the data.

21. The arrangement according to claim 20, wherein the field includes multiple data cells, each composed of said multiple lines, each data cell containing different information.

22. The arrangement according to claim 19, wherein the processing means includes means for storing the data signal for subsequent reference.

23. An arrangement for encoding data onto a television signal having an active video component and a timing component for lines of a picture to be displayed on a viewing area of a television receiver, comprising:

(a) means for generating a carrier signal in timed relation to the timing component of the television signal;

(b) means for generating a data signal indicative of the data to be processed;

(c) means for modulating the carrier signal and the data signal in timed relation to the timing component of the television signal to form a data-modulated signal having a low amplitude in a range from 0.1 to 2.5 IRE; and (d) means for adding the data-modulated signal to the active video component of the television signal to form an encoded composite signal on a plurality of lines of the picture, said data-modulated signal on said plurality of lines of the picture being substantially invisible to a viewer of the picture due to said low amplitude.

24. An arrangement for decoding data encoded on a data-modulated signal that is transmitted together with, and on multiple picture lines of, a television signal, comprising:
(a) means for receiving the transmitted data-modulated signal and the television signal on a television receiver having a viewing area on which a multiline picture is displayed, said data-modulated signal on each picture line of the picture having a low amplitude in a range from 0.1 to 2.5 IRE to render the data-modulated signal substantially invisible to a viewer; and
(b) means for demodulating the transmitted signals to extract therefrom a data signal indicative of the encoded data.

25. The arrangement according to claim 24, and further comprising means for storing the data signal for subsequent reference.

26. The method according to claim 2, and further comprising the step of varying the carrier signal frequency.

27. Apparatus for encoding a baseband composite video signal with auxiliary digital data, comprising:
a source of said baseband composite video signal having an amplitude, a spectral band and line intervals;
a source of said auxiliary digital data comprised of bits;
means for generating a modulated carrier having an amplitude and a frequency within the spectral band occupied by said composite video signal, and wherein each respective bit of said auxiliary digital data modulates said carrier over at least two line intervals of said composite video signal; and
means for adding said modulated carrier to said baseband composite video signal.

28. The apparatus set forth in claim 27, and further including means responsive to the amplitude o the baseband composite video signal for adjusting the maximum amplitude of said modulated carrier.

29. The apparatus set froth in claim 27, wherein the maximum amplitude of said modulated carrier is in the range of 0.1 to 2.5 IRE.

30. The apparatus set forth in claim 27, wherein said means for generating a modulated carrier includes means for providing said modulated carrier having a 180 degree phase relationship for pairs of successive line intervals.

31. The apparatus set forth in claim 27, wherein said means for generating a modulated carrier includes means for providing a phase shift keyed carrier.

32. The apparatus set forth in claim 27, wherein said means for generating a modulated carrier includes means for varying the frequency of said carrier.

33. Apparatus for decoding a television signal including auxiliary digital data occurring in active potions of a baseband composite video signal, said auxiliary digital data being comprised of bits for modulating an auxiliary carrier and conveying information, wherein each respective bit of said auxiliary digital data occupies at least the active portion of an interval, said apparatus comprising:
means for receiving said television signal and translating it to said baseband video signal;
means responsive to said baseband video signal for demodulating said auxiliary carrier to produce a demodulated auxiliary signal; and
means for integrating said demodulated auxiliary signal over intervals occupied by respective said bits to provide said auxiliary digital data.

34. The apparatus set forth in claim 33, wherein said means for integrating said demodulated auxiliary signal over intervals occupied by respective said bits, includes means for aggregating said bits into digital words.

35. The apparatus set forth in claim 33, wherein said means for integrating said demodulated auxiliary signal includes means for aggregating and recording said bits for subsequent retrieval.

* * * * *